July 16, 1946.    K. G. RIES ET AL    2,404,192
ABRASIVE ARTICLE AND METHOD OF MAKING Filed Dec. 29, 1944

INVENTORS
Kernell G. Ries
Norman P. Robie
BY Phyllis von Doenhoff
ATTORNEY

Patented July 16, 1946

2,404,192

UNITED STATES PATENT OFFICE 2,404,192

ABRASIVE ARTICLE AND METHOD OF MAKING

Kernell G. Ries, Niagara Falls, Norman P. Robie, Lewiston, and Phyllis von Doenhoff, Niagara Falls, N. Y., assignors to The Carborundum Company, Niagara Falls, N. Y., a corporation of Delaware Application December 29, 1944, Serial No. 570,314

7 Claims. (Cl. 51—211)

This invention relates to the manufacture of abrasive articles. More particularly, it relates to the manufacture of composite abrasive articles comprising two or more resin bonded bodies containing fillers, at least one of which is abrasive in character and capable of use for abrading purposes, the individual filler-containing resin bodies being integrally united to form the composite article. The invention also pertains to methods of using liquid or casting resins as bonds in the manufacture of such articles in which the constituent bonded bodies of the article are integrally combined, but with the fillers of those constituents sharply segregated one from another.

The present invention is especially adaptable for making dense, fine grit abrasive articles, as for example, the making of dual-purpose or combination honing stones embodying in the one article a resin bonded abrasive body containing a relatively coarse grit size abrasive filler for rough grinding and a resin bonded abrasive body containing an abrasive filler of much finer particle size for finishing grinding or final sharpening operations. It is highly desirable for most satisfactory results that such combination sharpening stones or hones be as dense and uniform as possible in order to avoid uneven or irregular cutting action on the instrument being sharpened and also that the different size abrasive particles employed in making the article be kept from intermingling one with the other. Heretofore such combination sharpening stones have been formed by pressure molding relatively dry but dampened mixtures of the abrasive powder and powdered resin in a hot mold, followed by a prolonged oven cure. When prepared according to such procedures, the aggregation of the resin powder into larger particles has prevented a thorough wetting and dispersing of the finely divided abrasive material, and, as a result, the articles so made have not been as uniform as could be desired. The formation of such articles by pressing methods has also required the use of costly molds and presses, and required long, high temperature cures.

Certain of the above disadvantages have also been encountered in the making of composite abrasive articles embodying a resin bonded abrasive grinding surface integrally combined with a non-abrasive resin bonded supporting or body portion, as for example, the making of a resin bonded grinding wheel having the abrasive particles confined to that part of the wheel in the vicinity of one or both flat faces or extending radially inward but a short distance from the periphery of the wheel. As in the making of the combination sharpening stones mentioned above, the manufacture of such articles by pressing procedures entails the use of expensive equipment and lengthy processes.

It has, therefore, long been desirable to find some other more advantageous way of making such articles. Previous attempts to form the aforesaid articles from liquid mixtures of bond and abrasive or other filler materials have not met with complete success due to the inability to obtain a satisfactorily strong union between the constituent parts of the article and at the same time prevent an undesirable mixing or intermingling of the various abrasive and/or non-abrasive fillers employed in making the article.

It is an object of the present invention to provide such composite abrasive articles having an improved uniformity and structure. It is a further object to provide improved methods of manufacturing such articles which will avoid the disadvantages and undesirable features of prior art methods as above set forth.

We have found that composite abrasive articles can be made with a plurality of casting compositions in one article without intermixing of the powdered filler materials contained in those casting compositions by the use of a porous diaphragm inserted between the different casting compositions. The porous diaphragm allows the liquid, unpolymerized bond to pass through and join the mixes into a unitary article without permitting the intermixing of the various filler materials.

According to the present invention, composite abrasive articles of the type described above are made by first forming a suitable mixture of a liquid or casting resin together with the selected filler or fillers for forming one part of the article and placing a sufficient amount of the mixture in a mold of the desired shape to form that part of the article when set, after which a thin layer of porous sheet material, such as a sheet of coarse filter paper, is placed in the mold over the contents of liquid resin and filler as a diaphragm. A mixture of liquid resin and filler which is to constitute the second part of the composite article is then prepared and poured into the mold on top of the thin sheet of porous material and the entire mold contents are allowed to harden or set after which the molded shape is removed from the mold, and when desired, given a suitable oven cure. Other porous materials can be used as the intercalary diaphragm in place of the filter paper between the constituent resin-filler mixes so long as the material chosen is permeable to the resin bond and impervious to the different granular fillers employed in making the article.

The liquid resin bond used in forming the two different parts of the article is usually the same although different resins can be used to form the various parts of the article, providing they are compatible and are capable of penetrating the porous intercalary sheet material. In the article so formed, it will also be found that if the proper materials are selected, the granular fillers contained in the various parts of the article will not pass through the porous sheet material, so that there will be a sharp, clear dividing line between the component parts of the resulting abrasive article with no intermingling of the different filler materials.

A modified method of making abrasive articles embodying the principle of the present invention, and a method which is particularly adaptable to forming abrasive articles of the type wherein the abrasive is confined to a relatively small portion of the article in the immediate vicinity of the grinding surface, can be carried out as follows. The porous diaphragm or separating medium, such as a layer of filter paper, is first coated on one side with a mixture of liquid or casting resin and abrasive particles, either by first applying a coating of the resin to the filter paper and then adding the abrasive particles to the adhesively-coated surface or mixing the abrasive particles with the liquid resin and applying the mixture to the filter paper or other porous sheet material. The thus coated filter paper is then suitably placed in a mold with the resin and abrasive coated side facing the inner mold surfaces and the mold filled with the liquid resin mixture, usually containing a non-abrasive filler, which is to constitute the body of the article, and the mold contents allowed to set or harden, after which the article so formed is removed from the mold and usually given an oven cure. Again, the abrasive particles will be preserved in position at and adjacent to the grinding surface of the resulting article whereas the penetration of the resin bond therefor through the porous sheet serves to strongly combine the abrasive containing portion to the main body of the article with no danger of delamination.

In order to better understand the nature of the invention, reference is made to the accompanying drawing, in which.

Figure 1:
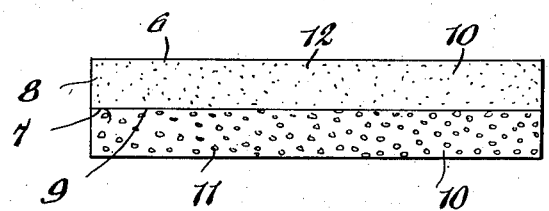
Figure 1 is a side view of a combination abrasive sharpening stone made in accordance with the present invention.

Referring further to the drawing, Figure 1 is a side view of a combination sharpening stone 6 composed of a coarse grit size abrasive body 7 and a fine grit size abrasive body 8, the abrasive fillers of the two bonded abrasive bodies 7 and 8 being separated in a sharp line of demarcation between them by reason of the presence between the two bonded bodies of a thin sheet of porous filter paper 9 which is permeable to the resin bond 10 but is impervious to either the coarse abrasive particles 11 of the bonded body 7 or the fine abrasive particles 12 of the resin bonded body 8.

The composite sharpening stone shown in Figure 1 can be formed in the usual type of mold by partially filling the mold with the first pourable, liquid resin mixture, inserting the porous sheet material on top of the mold contents by hand, and filling the balance of the mold with the second desired mixture. However, it is desirable to hold the porous diaphragm tightly in position in order to prevent wrinkling or dislocation of the sheet material during the pouring of the second mixture into the mold. This can be accomplished more easily by forming the article in molds such as those shown in Figures 2 and 3, which are usually of suitable metallic construction with the exception of the diaphragm which is usually a porous fibrous sheet material. The mold construction depicted in Figure 2 consists of a lower mold half 14 and an upper mold half 15 which fits tightly over the lower half 14, holding the porous diaphragm 16 in place. The slight outward flare 17 of the upper mold half assists in quickly placing the upper half in position on the lower half. In use, the lower mold half 14 is filled with the first liquid, filler-containing mixture and the sheet 16 of porous material constituting the diaphragm is placed upon the top of the freshly poured contents and held tightly in place while the upper half of the mold is placed in position, thereby holding the diaphragm firmly and accurately in place. The second liquid mixture containing a different filler is then poured on top of the diaphragm to fill the upper half of the mold. The mold contents are then allowed to set, removed from the mold and usually given an oven cure to mature the resin bond. If desired, the mold contents can be subjected to a heat treatment at low temperature to hasten setting of the resin bond.

Figure 2:
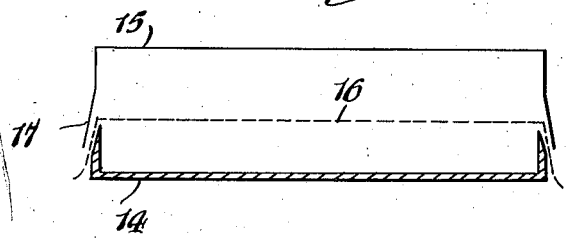
Figure 2 is a vertical cross-sectional view illustrating one form of mold set-up used in carrying out the present invention.
Figure 3:
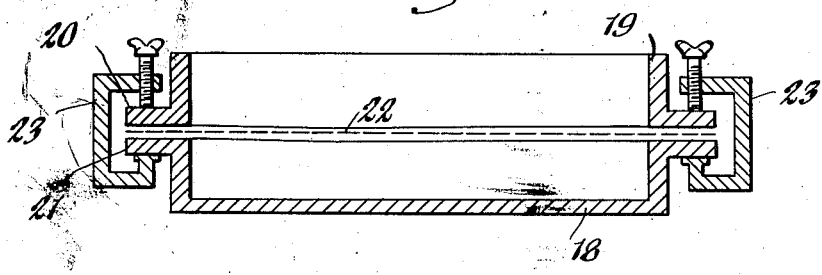
Figure 3 is a vertical cross-sectional view illustrating a modified form of mold set-up which can be used in connection with the present invention.

The mold in Figure 3, like that in Figure 2, consists of a lower mold half 18 and an upper mold half 19 and is used similarly. The two mold constructions differ in the manner of holding the porous diaphragm in place. In Figure 3 the upper and lower mold halves 18 and 19 are equipped with side lips 20 and 21 which fit together to hold the porous diaphragm 22 tightly in position. The clamps 23 serve to draw the mold lips tightly together.

Figure 4:
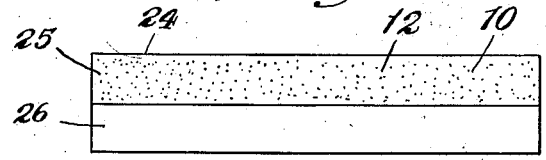
Figure 4 is a side view of a modified form of abrasive sharpening stone made in accordance with the present invention.

Figure 4 is a side view of a modified abrasive sharpening stone 24 similar in shape and construction to that depicted in Figure 1 but differing therefrom in the composition of the two bodies 25 and 26 which make up the article. The abrasive article shown in Figure 4 is composed of a resin-bonded, fine grit size abrasive body 25 and a resinous non-abrasive body 26, the two bodies 25 and 26 being separated in a sharp line of demarcation between them by reason of the presence between the two bodies of a thin sheet of porous filter paper 9 which is permeable to the resin bond 10 but is impervious to the fine abrasive particles 12 of the resin bonded abrasive body 25 and also impervious to any non-abrasive filler substances which may be incorporated, when desired, in the non-abrasive resinous body 26.

The following example is given as illustrative.

A combination abrasive hone, such as that shown in Figure 1, was made having one face suitable for preliminary honing comprising resin bonded 320 mesh size, silicon carbide and the opposite face suitable for finish honing and comprising resin bonded, 600 mesh and finer fused alumina. The same bond was used throughout. The mixture for the bottom layer was composed of 26% allyl resin monomer (such as that known and sold by the Columbia Chemicals Division of Pittsburgh Plate Glass Co. as CR–39 resin monomer) and 74% 320 mesh silicon carbide and containing dissolved in the monomer benzoyl peroxide catalyst to the extent of 3% of the monomer. This liquid mixture was poured into a rectangular mold such as that shown in Figure 2. A sheet of very porous filter paper was then laid upon the freshly poured mix. A second casting mixture was poured onto the filter paper to fill the mold. This second casting mixture consisted of 30% of allyl resin monomer known as CR-39 monomer, 70% very fine fused alumina polishing powder having a particle size of 600 mesh and finer and 3% benzoyl peroxide based on the monomer. The mold contents were allowed to solidify after which the cast article was removed from the mold and the resin bond cured at 150° F. for 18 hours, then raised 15 degrees per hour for two hours, 10 degrees per hour for two hours, and finally held one hour at 200° F. The cured hone was surfaced on a rotating metal lapping disc charged with abrasive and water. The finished article was extremely uniform and of high density with a sharp line of demarcation between the different bonded abrasive bodies thereof. The resin bond thoroughly penetrated through and hardened in the filter paper so that there was no sign of delamination or weakness in the line of union between the different bonded parts of the article.

The bonds which may be used to make cast articles according to the practices of the present invention include those resins produced from unsaturated monomers by addition polymerization. Typical monomers are the vinyl, acrylic and allyl monomers, such as diallyl phthalate, diallyl maleate, diallyl fumarate, methyl-methacrylate, vinyl acetate, styrene, diallyl diethylene glycol carbonate, and the like. Mixtures of monomers to produce copolymers and cross linked resins may also be used. We may also use solutions of reactive resins in monomers such as a solution of an unsaturated alkyd of the glycol-maleic anhydride type in diallyl phthalate or styrene monomer. It is also possible to use certain initial condensation polymers in liquid form, such as heat hardenable, liquid urea or phenolic casting resins.

In practicing the invention any of the abrasive materials in common use may be employed such as silicon carbide, diamonds, boron carbide, fused aluminum oxide, flint, corundum, emery, rouge, and similar substances. The size of the abrasive particles may vary from the finest polishing or buffing powder to the coarser grit sizes used in grinding. When composite abrasive articles are being formed wherein one of the resin bonded bodies constituting the entire article is non-abrasive in character any organic or inorganic non-abrasive fillers may be incorporated in the resin bond thereof, such as carbon black, clays, wood flours, mineral fillers and the like.

The present invention is very adaptable to making composite abrasive articles which employ a relatively finely divided abrasive material and dense bond in one or more of the sections making up the article, such as the combination hone previously illustrated. The shape of the sections making up the article may vary and may consist of cylinders, rods, sections of a circle and other shapes as well as layers. Other composite articles which can be made include mounted honing wheels, diamond wheels, discs for lapping machines, die honing sticks, polishing discs, thread grinding wheels, and so forth.

Having described and set forth the invention in detail, the scope of the invention is not to be confined other than by the appended claims.

We claim:

1. A resin bonded composite abrasive article having at least two dissimilar abrading bodies integrally united by means of compatible resin bonds of the constituent abrasive bodies, the characteristic abrasive material of each abrading body of the article being separated from the abrasive material of the adjoining abrading body by a thin layer of sheet material permeable to the resin bonds but impervious to the abrasive materials of said article.

2. A resin bonded composite abrasive article having at least two dissimilar abrading bodies integrally united by means of a resin bond common to the constituent bodies thereof, the characteristic abrasive material of each abrading body of the article being separated from the abrasive material of the adjoining abrading body by a thin layer of sheet material permeable to the resin bond but impervious to the abrasive materials of said article.

3. A resin bonded abrasive article comprising a surface portion of resin bonded abrasive material integrally united to a resinous body portion through an intercalary fibrous sheet material impervious to the abrasive particles of said surface portion but permeated by the resin bond.

4. A resin bonded abrasive article comprising a body of resin bonded abrasive material integrally united to a non-abrasive resinous body through an intercalary fibrous sheet material inpervious to the abrasive particles of the abrasive body but permeated by the resin bond of the article.

5. A method of making bonded abrasive articles which comprises preparing a mixture comprising a liquid resin and an abrasive filler, pouring said mixture into a suitable mold, placing a thin sheet of fibrous material permeable to the liquid resin but impervious to the abrasive filler of the aforesaid mixture over the top surface of the mixture contained in said mold, preparing a second mixture comprising a liquid resin and an abrasive filler differing from the filler of the first mixture, pouring the second mixture into the aforesaid mold on top of said sheet material, allowing the mold contents to set and removing them from the mold.

6. A method of making bonded abrasive articles which comprises preparing a mixture comprising a casting resin and an abrasive filler, pouring said mixture into a suitable mold, placing a thin sheet of porous material permeable to the casting resin but impervious to the abrasive filler of the aforesaid mixture over the top surface of the mixture contained in said mold, preparing a second mixture comprising a casting resin and an abrasive filler differing from the filler of the first mixture, pouring the second mixture into the aforesaid mold on top of said sheet material, allowing the mold contents to set and removing them from the mold.

7. A method of making bonded abrasive articles which comprises preparing a mixture comprising a liquid resin and an abrasive filler, pouring said mixture into a suitable mold, placing a thin sheet of fibrous material permeable to the liquid resin but impervious to the abrasive filler of the aforesaid mixture over the top surface of the mixture contained in said mold, preparing a second mixture comprising a liquid resin and a non-abrasive filler, pouring the second mixture into the aforesaid mold on top of said sheet material, allowing the mold contents to set and removing them from the mold.

KERNELL G. RIES.
NORMAN P. ROBIE.
PHYLLIS von DOENHOFF.